United States Patent [19]
Yumoto et al.

[11] Patent Number: 5,189,439
[45] Date of Patent: Feb. 23, 1993

[54] IMAGE RECORDING DEVICE FOR RECORDING A PREDETERMINED NUMBER OF IMAGES ON A SINGLE RECORDING MEDIUM

[75] Inventors: Toshiharu Yumoto, Nagano; Tsuyoshi Shoji, Tokyo, both of Japan

[73] Assignee: Fuji Photo Film Co., Ltd., Kanagawa, Japan

[21] Appl. No.: 851,259

[22] Filed: Mar. 13, 1992

Related U.S. Application Data

[63] Continuation of Ser. No. 617,313, Nov. 23, 1990, abandoned.

[30] Foreign Application Priority Data

Nov. 25, 1989 [JP] Japan .................. 1-305712

[51] Int. Cl.$^5$ ............................... B41J 2/32
[52] U.S. Cl. ................................. 346/76 PH
[58] Field of Search ........... 346/76 PH, 1.1, 140 R; 395/164, 157

[56] References Cited

U.S. PATENT DOCUMENTS

| | | | |
|---|---|---|---|
| 4,505,576 | 3/1985 | Sugiura et al. | 395/164 |
| 4,953,104 | 8/1990 | Yeh et al. | 364/519 |
| 4,959,793 | 9/1990 | Suzuki | 395/164 |
| 4,975,859 | 12/1990 | Takagishi et al. | 364/519 |
| 4,996,649 | 2/1991 | Kamei et al. | 364/518 |
| 5,006,866 | 4/1991 | Someya | 346/76 PH |
| 5,025,397 | 6/1991 | Suzuki | 364/519 |
| 5,150,462 | 9/1992 | Takeda et al. | 395/164 |

FOREIGN PATENT DOCUMENTS

| | | | |
|---|---|---|---|
| 0117327 | 6/1985 | Japan | 395/164 |
| 013875 | 1/1986 | Japan | 346/76 PH |

Primary Examiner—Benjamin R. Fuller
Assistant Examiner—N. Le
Attorney, Agent, or Firm—Sughrue, Mion, Zinn Macpeak & Seas

[57] ABSTRACT

An image recording device for recording one or more images on a single recording medium includes a frame memory having a plurality of frame memory areas, the number of which is at least one greater than the number of images arranged along a main scanning direction on a recording medium. Upon the completion of storage of image data in the a number of frame memory areas equal to the number of images arranged along the main scanning direction, a storage completion signal is produced. A recording unit is energized to automatically record the images on the recording medium in response to the storage completion signal, and new image data are stored in another frame memory area.

13 Claims, 6 Drawing Sheets

| FORMAT | TOTAL NUMBER OF HORIZONTAL PIXELS |
|---|---|
| 1 FRAME/SHEET | 1280 |
| 2 FRAME/SHEET | 1088 |
| 4 FRAME/SHEET | 1280 |
| 6 FRAME/SHEET | 1088 |

| FORMAT | PRESET VALUE |
|---|---|
| 1 FRAME/SHEET | 1 |
| 2 FRAME/SHEET | 1 |
| 4 FRAME/SHEET | 2 |
| 6 FRAME/SHEET | 2 |

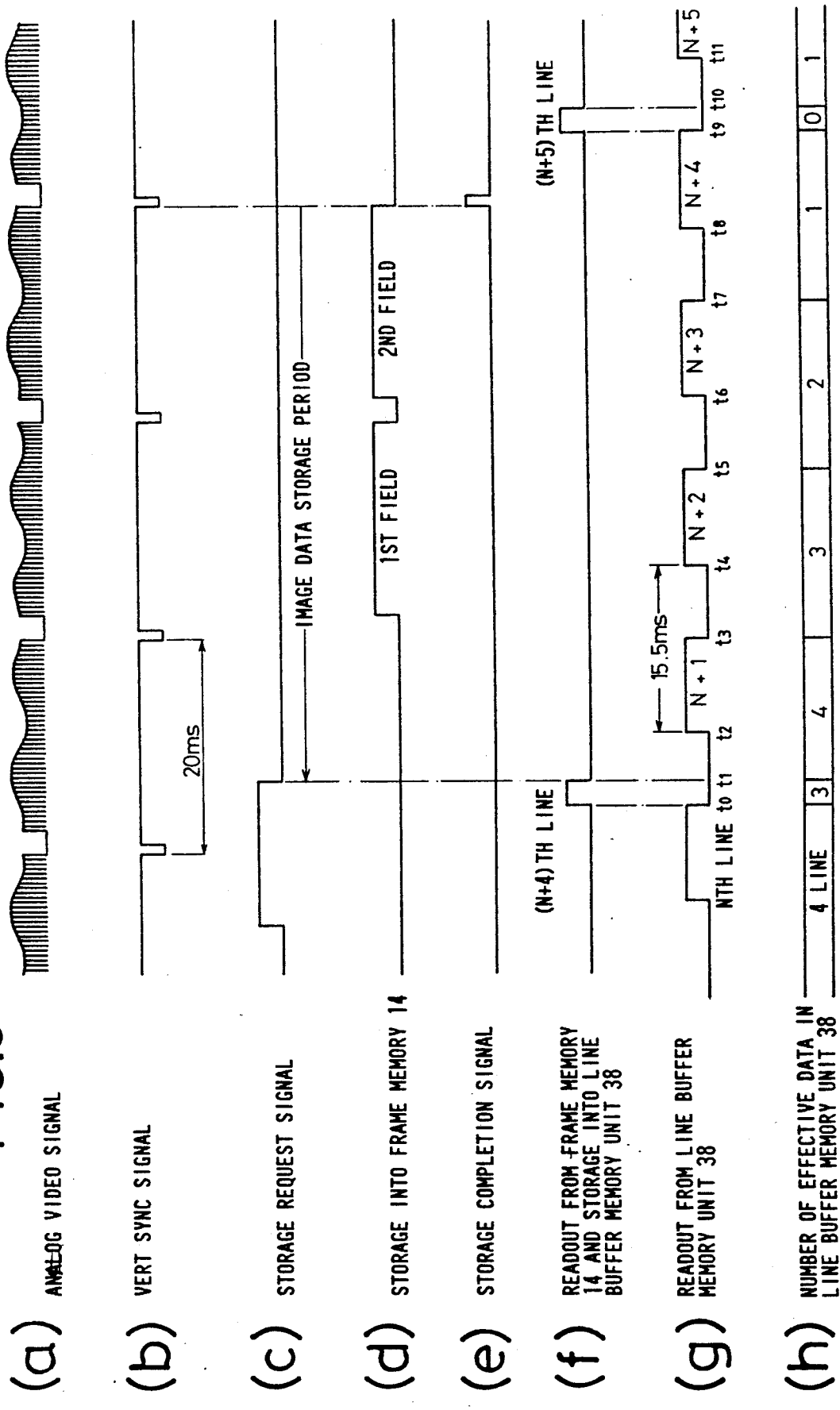

IMAGE RECORDING DEVICE FOR RECORDING A PREDETERMINED NUMBER OF IMAGES ON A SINGLE RECORDING MEDIUM

This is a continuation of application Ser. No. 07/617,313 filed Nov. 23, 1990, now abandoned.

BACKGROUND OF THE INVENTION

1. Field of the Invention

The present invention relates to an image recording device for recording a predetermined number of images on a single recording medium.

2. Description of the Related Art

Medical imaging systems such as CT scanners are widely used to obtain image information about local regions, especially afflicted regions, of human bodies. Images reconstructed from such image information are highly useful because they allow the doctor to get a clear view of the local body regions for diagnostic purpose. Actually, the obtained image information is displayed on a CRT monitor or the like, and the doctor diagnoses the imaged region based on the displayed image. The image information displayed on the CRT monitor may also be recorded on a recording medium such as a heat-sensitive recording medium, for example, which may be stored as a hard copy and subsequently be retrieved for medical diagnosis anytime and anywhere, i.e., without time and space limitations. The image information is represented by an image signal which is generated by an image signal source such as a CT scanner or any of various other suitable imaging systems. The image signal is usually applied as an analog video signal to an image output device such as a thermal printer or the like. In the thermal printer, the analog video signal is converted into thermal printing data which are then recorded on a heat-sensitive recording medium by a thermal head.

In some instances, a plurality of images of body regions in the vicinity of a body region to be recorded for diagnosis should also be simultaneously produced on a single recording medium for higher diagnostic accuracy. The simultaneous recording of plural images on a single recording medium is also advantageous from the standpoint of saving storage space for recording mediums.

One conventional image recording device for recording a plurality of images on a single recording medium includes a frame memory corresponding in size to the recording medium, the frame memory having as many as memory areas as the number of images to be recorded. The image recording device has a single address counter for specifying memory addresses where to store desired image data in the frame memory. After desired image data have been stored at specified memory addresses in the frame memory, desired image data stored in the frame memory are retrieved by specifying corresponding memory addresses using the address counter, and then transferred to a scanning recording unit which may comprise a laser scanner, for recording an image on a photosensitive medium in the scanning recording unit.

In such an image recording device, it is desirable that an image to be reproduced on a recording medium be of high resolution to avoid erroneous medical diagnosis based on the reproduced image. In addition, it is also desirable that image data in a new frame be stored in the frame memory while an image is being recorded on the recording medium, for the purpose of shortening the total period of time required for image recording.

The frame memory of the conventional image recording device has a fixed memory area or capacity allotted for a single image to be recorded on the recording medium. Therefore, if the number of images to be recorded on the recording medium is increased, then a memory capacity available for one image is reduced, and the resolution of the recorded images is also lowered.

Furthermore, since only one address counter is employed in the image recording device, no new image data can be recorded in the frame memory while the stored image data are being read from the frame memory. Therefore, while an image is being printed or recorded, new image data cannot be stored in the frame memory, and hence the time required to record desired images cannot be shortened.

The above drawbacks would be obviated if a plurality of frame memories were employed for a greater memory area, and as many address counters were associated with the respective frame memories. However, such a solution would make the image recording device large in size and expensive to manufacture.

SUMMARY OF THE INVENTION

It is a primary object of the present invention to provide an image recording device which can record images with high resolution, employs a reduced number of frame memory areas and hence has a reduced memory capacity, and can store new image data while an image is being recorded.

According to the present invention, there is provided an image recording device for recording one or more images on a single recording medium, comprising recording means for recording the images on the recording medium, a frame memory comprising a plurality of frame memory areas, the number of which is at least one greater than the number of images arranged along a main scanning direction on the recording medium, and determining means for determining the completion of storage of image data in the same number of frame memory areas as the number of the images arranged along the main scanning direction, and for producing a storage completion signal n response to the determined completion of storage.

The determining means comprises storage completion signal producing means for producing the storage completion signal in response to detection of storage of image data relative to an image in each of the frame memory areas, and completion signal producing means for counting storage completion signals and producing a completion signal when the count of storage completion signals reaches a preset value.

The storage completion signal producing means comprises an address counter for addressing the frame memory areas which store the image data.

The completion signal producing means comprises a counter for counting down the preset value in response to the storage completion signal and producing the completion signal when the preset value reaches zero.

The image recording device further comprises processing means for energizing the recording means to automatically record the images on the recording medium in response to the storage completion signal, and for storing new image data in another frame memory area.

The processing means comprises a buffer memory for temporarily storing the image data before the image data are transferred to the recording means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4A is a diagram showing a table of the total numbers of horizontal pixels stored in a memory in the image recording device;

FIG. 4B is a diagram showing a table of preset values stored in the memory in the image recording device;

FIGS. 6a-6h are timing chart showing the relationship between a period of time in which an image is stored and a period of time in which an image is recorded.

DETAILED DESCRIPTION OF THE PREFERRED EMBODIMENT

Figure 1:
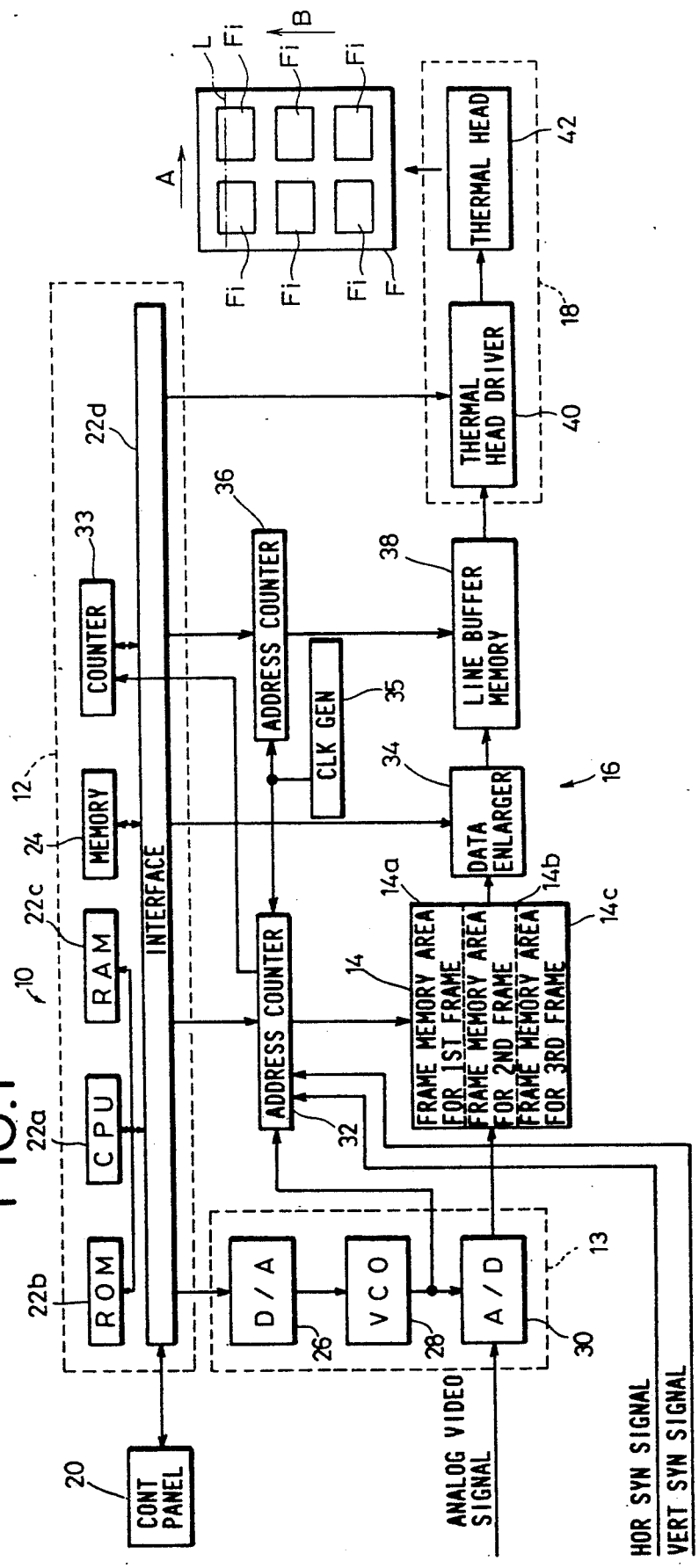
FIG. 1 is a block diagram of a thermal printer which incorporates an image recording device according to the present invention.

FIG. 1 shows a thermal printer which incorporates an image recording device according to the present invention. The thermal printer, generally denoted at 10, basically comprises a determining/processing assembly 12, a signal converter assembly 13 for converting an analog input video signal into digital image data, a data storage assembly 16 for storing the image data and processing the image data such as for enlarging an image represented by the image data, and a recording assembly 18 for recording the image data from the data storage assembly 16 on a heat-sensitive medium F.

The thermal printer 10 has a control panel 20 which is used to enter, into the determining/processing assembly 12, the number of images (format) to be recorded on the single heat-sensitive medium F, the type of the analog input video signal applied to the signal converter assembly 13, and a request for the storage of the analog input video signal in the data storage assembly 16.

The information which is entered from the control panel 20 is introduced into the determining/processing assembly 12, which comprises a CPU 22a, a ROM 22b, a RAM 22c, an interface 22d, a memory 24, and a counter 33. The memory 24 may comprise a floppy disk, an IC memory, or the like. In the determining/- processing assembly 12, information relative to a sampling frequency, for example, is read from the memory 24 based on the information from the control panel 20. The read information is then sent to the signal converter assembly 13. The signal converter assembly 13 comprises a D/A converter 26, a voltage-controlled oscillator (VCO) 28, and an A/D converter 30. The information from the determining/processing assembly 12 is first converted into an analog signal, which is then applied to the VCO 28. The VCO 28 supplies sampling pulses, whose frequency is based on the analog signal, to the A/D converter 30 and an address counter 32. The A/D converter 30 converts the analog input video signal into digital image data based on the supplied sampling pulses, and transmits the digital image data to the data storage assembly 16.

Figure 2:
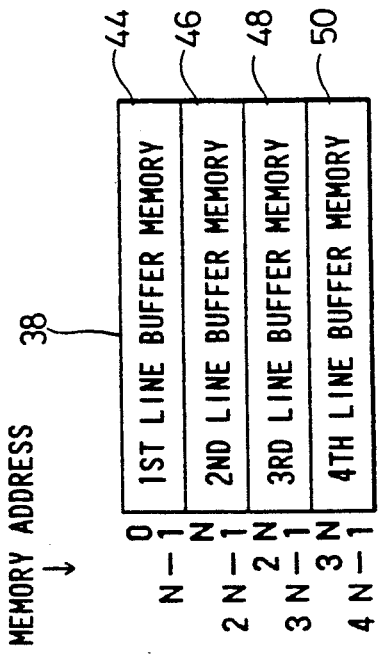
FIG. 2 is a diagram showing divided memory areas of a frame memory in the image recording device.

The data storage assembly 16 comprises a frame memory 14, a data enlarger 34, a line buffer memory unit 38, address counters 32, 36, and a clock generator 35. As shown in FIG. 2, the frame memory 14 comprises a frame memory area 14a for storing a first frame, with memory addresses 0 through M−1 allotted thereto, a frame memory area 14b for storing a second frame, with memory addresses M through 2M−1 allotted thereto, and a frame memory area 14c for storing a third frame, with memory addresses 2M through 3M−1 allotted thereto. These frame memory areas 14a, 14b, 14c are addressed by the address counter 32 under the control of the determining/processing assembly 12. In order to count up the memory addresses, the address counter 32 is supplied wit horizontal and vertical synchronizing signals of the analog video signal and a clock signal from the clock generator 35.

The address counter 32 supplies the counter 33 with a storage completion signal which indicates the completion of storage of one frame of image data. At this time, the counter 33 is supplied with a preset value corresponding to the number of frames or images (format) to be recorded on the heat-sensitive medium F, the preset value being entered from the control panel 20 and transferred from the memory 24 under the control of the CPU 22a.

As the frame memory 14 is addressed by the address counter 32, the stored image data are read from the frame memory 14 and transmitted through the data enlarger 34 to the line buffer memory unit 38, which is addressed by the address counter 36 that is supplied with the clock signal from the clock generator 35.

The image data stored in the line buffer memory unit 38 are thereafter transferred to the recording assembly 18. The recording assembly 18 comprises a thermal head driver 40 and a thermal head 42. The image data from the line buffer memory unit 38 is transmitted through the thermal head driver 40 to the thermal head 42. The thermal head 42 comprises a linear array of heating elements along a main scanning direction indicated by the arrow A.

Figure 3:
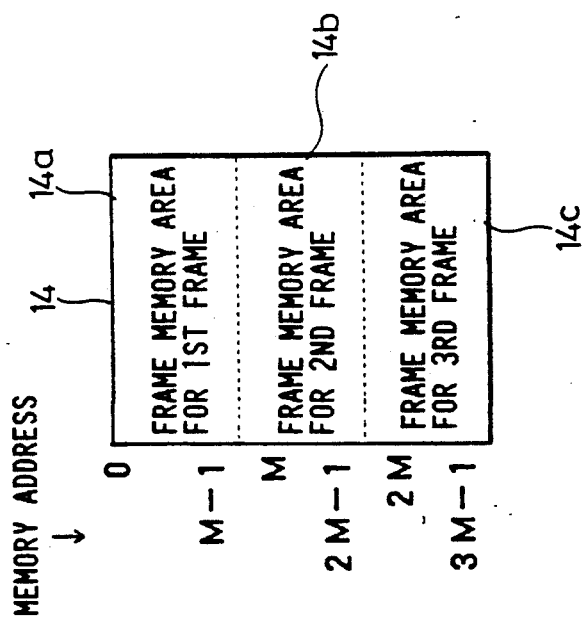
FIG. 3 is a diagram showing memory addresses for a line buffer memory in the image recording device.
Figure 5A:
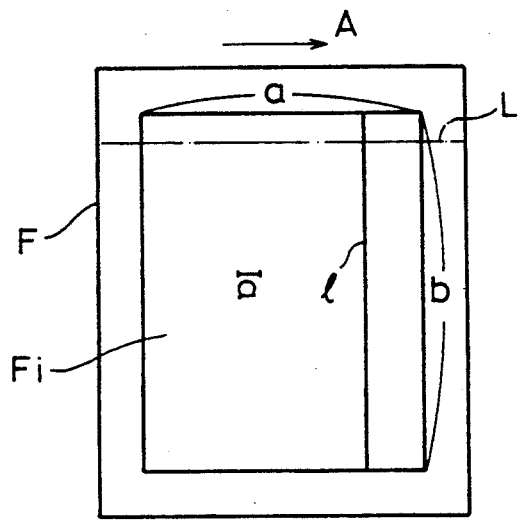
FIGS. 5A, 5B, 5C, and 5D are diagrams illustrative of arrangements of frames recorded on a single heatsensitive medium.
Figure 5B:
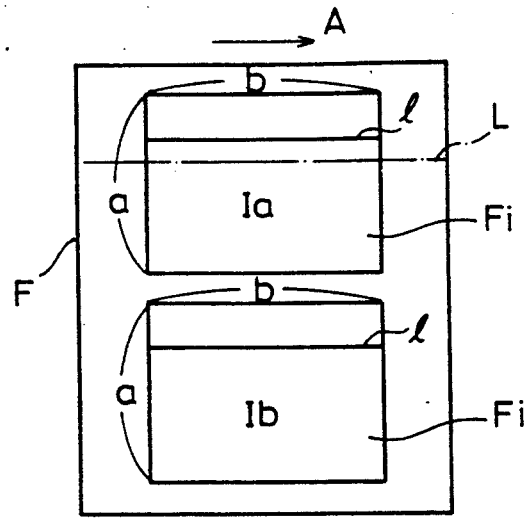
Figure 5C:
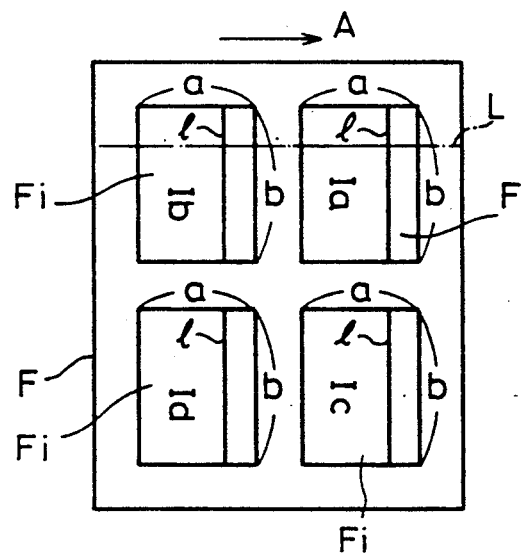
Figure 5D:
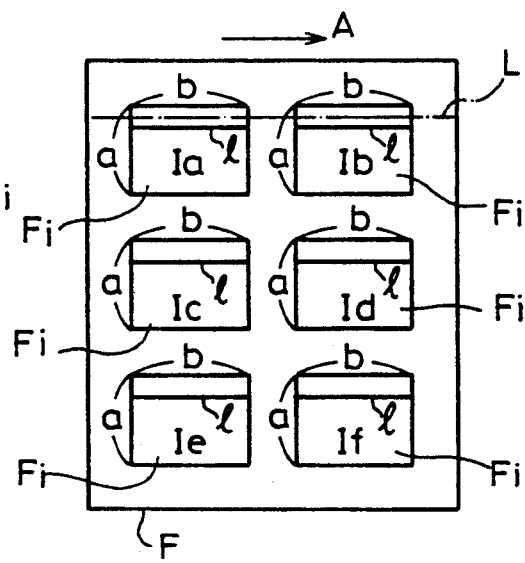

As shown in FIG. 3, the line buffer memory unit 38 comprises first, second, third, and fourth line buffer memories 44, 46, 48, 50, with memory addresses 0 through N−1, N through 2N−1, 2N through 3N−1, and 3N through 4N−1 allotted respectively thereto.

As shown in FIGS. 4A and 4B, the memory 24 stores a table 53 of the total numbers of horizontal pixels and a table 51 of preset values. In each of the tables 53, 51, the term "format" represents the number of frames I (I=Ia, Ib, Ic, Id, Ie, If) to be recorded on the single heat-sensitive medium F, as shown in FIGS. 5A through 5D. In FIGS. 5A through 5D, the reference characters Ia through If are oriented in the direction in which images Fi are erected. In this embodiment, there are four formats, one frame per sheet, two frames per sheet, three frames per sheet, and four frames per sheet.

The total number of horizontal pixels, which is determined by a format, is the total number of pixels in one period of the horizontal synchronizing signal of digital image data that constitute the frame I when the image data are stored in the frame memory 14.

In order to record images Fi on a single recording medium or sheet in a well-balanced layout, the images Fi are differently oriented between the formats with 1 and 4 frames per sheet and the formats with 2 and 6 frames per sheet. In the formats with 1 and 2 frames per sheet, the sizes of the images are enlarged, and the numbers of pixels along one horizontal line l normal to the direction in which the images Fi are erected when they are recorded on the heat-sensitive recording medium are 2 and 1.5 times the total numbers of horizontal pixels shown in FIG. 4A. In the formats with 4 and 6 frames per sheet, however, the images are not enlarged, and hence the numbers of pixels along one horizontal line l are the same as the total numbers of horizontal pixels shown in FIG. 4A.

The preset values which can be transferred from the memory 24 to the counter 33 are the same as the numbers of frames I arranged on the heat-sensitive medium F along the main scanning direction A. Therefore, the preset value is 1 for the formats with 1 and 2 frames per sheet, and 2 for the formats with 4 and 6 frames per sheet.

The thermal printer which incorporates the image recording device according to the present invention is basically constructed as described above. Operation of the thermal printer will now be described below.

The operator (not shown) selects a desired analog video signal source and connects the selected analog video signal source to the A/D converter 30. Then, the operator operates on the control panel 20 to enter information relative to the type of a analog video signal to be supplied from the connected analog video signal source, and also information relative to the number (e.g., 6) of frames or images to be recorded on a single heat-sensitive medium F. The entered information is stored in the RAM 22c of the determining/processing assembly 22c.

Then, the information relative to the number of frames is read from the RAM 22c by the CPU 22a. Based on this information, the CPU 22a determines the total number of horizontal pixels from the table 53 shown in FIG. 4A and also the preset value, which is to be sent to the counter 33, from the table 51 shown in FIG. 4B. Since 6 frames are to be reproduced on the single heat-sensitive medium F, by way of example, the total number of horizontal pixels is 1088, and the preset value is 2 which is the same as the number of frames along the main scanning direction A. The counter 33 is now set to the preset value of 2.

Sampling pulses to be supplied to the A/D converter 30 will be described below. Depending on the type of the analog video signal, predetermined digital data are supplied from the determining/processing assembly 12 to the D/A converter 26 and converted into an analog voltage signal by the D/A converter 26. The VCO 28 then produces sampling pulses which have a sampling frequency corresponding to the analog voltage signal, and applies the sampling pulses to the A/D converter 30. When a request for the storage of the analog video signal is produced by the control panel 20, the A/D converter 30 converts an analog video signal corresponding to the first frame, of the analog video signal supplied to the A/D converter 30, into digital image data.

The determining/processing assembly 12 starts to operate the address counter 32 to specify the memory address 0 of the frame memory 14. The digital image data corresponding to the first frame are now stored in the frame memory area 14a which has the memory addresses 0 through M−1. At this time, the counter 33 is counted down to 1 by a storage completion signal from the address counter 32.

Then, digital image data corresponding to a new frame are stored in the frame memory area 14b which has the memory addresses M through 2M−1. At this time, the count of the counter 33 is reduced to 0, and applies a count completion signal to the CPU 22a. Thereafter, the counter 33 is set to the preset value of 2 again.

In response to the count completion signal, the CPU 22a operates as follow: Among the image data stored in the frame memory areas 14a, 14b, image data corresponding to the first through fourth lines along the main scanning direction A on the heat-sensitive medium F are transmitted to the first through fourth line buffer memories 44 through 50 of the line buffer memory unit 38 while the frame memory areas 14a, 14b and the line buffer memory unit 38 are being addressed by the address counters 32, 36 which are counted up by the clock signal from the clock generator 35. At this time, the image data from the frame memory 14 are delivered through the data enlarger 34 to the line buffer memory unit 38, but not enlarged in image size.

Then, the image data transmitted to the line buffer memory unit 38, which corresponds to the first line along the main scanning direction A on the heat-sensitive medium F, are applied to and converted by the thermal head driver 40 into a pulse signal, which is then applied to the thermal head 42. The thermal head 42 then scans the heat-sensitive medium F along the main scanning direction A to record the corresponding image data thereon. Thereafter, image data corresponding to the fifth line along the main scanning direction A are transmitted from the frame memory 14 into the first line buffer memory 44 from which the first-line image data have been read out.

After the second-line image data have been read from the second line buffer memory 46 and recorded on the heat-sensitive medium F, sixth-line image data are transmitted from the frame memory 14 to the second line buffer memory 46. The image data stored in the frame memory 14 are successively recorded on the heat-sensitive medium F in the above manner. At the same time, the heat-sensitive medium F is moved in an auxiliary scanning direction indicated by the arrow B by a feed means (not shown). Therefore, an image Fi is two-dimensionally recorded on the heat-sensitive medium F. If a request for the storage of an analog video signal relative to a new frame is transmitted from the control panel 20 during the above recording process, then the image data relative to the new frame are stored in the frame memory area 14c which has the memory addresses 2M through 3M−1, and the count of the counter 33 becomes 1.

The relationship, between a period of time in which image data are recorded by the recording assembly 18 and a period of time in which image data are stored in the memory frame area 14c of the frame memory 14 is shown in the timing charts of FIG. 6a–6h. Up to a time $t_0$, image data relative to an Nth line along the main scanning direction A are read from the line buffer memory 38 (see FIG. 6 at (g)), and printed by the thermal head 42. At this time, the effective image data stored in the line buffer memory unit 38 are for three lines (see FIG. 6 at (h)) Then, image data relative to the (N+4)th line are transmitted from the frame memory areas 14a, 14b through the data enlarger 34 to the line buffer memory unit 38 (see FIG. 6 at (f))

The transfer of the image data from the frame memory areas 14a, 14b to the line buffer memory unit 38 is completed between the time $t_0$ and a time $t_1$. At the time $t_1$, the effective image data in the line buffer memory unit 38 are for four lines. If a request for the storage of an analog video signal (see FIG. 6 at (a)) relative to a new frame has been produced by the control panel 20 by the time $t_1$ (see FIG. 6 at (c), with a storage request flag being "1"), then the image data start being stored. The address counter 32 specifies the memory addresses 2M through 3M−1 of the frame memory 14c, which stores the image data relative to the next frame Ic (see FIG. 6 at (d)) One frame is composed of two successive fields, and the period of a field, i.e, the period of a vertical synchronizing signal, is 20 ms (see FIG. 6 at (b)) Therefore, the time (image data storage period) required to complete the storage of the image data relative to the new frame is 20 ms×3=60 ms at maximum.

When the storage of the image data is completed, the address counter 32 applies a storage completion signal to the counter 33 (see FIG. 6 at (e)) The address counter 32 is counted up by vertical and horizontal synchronizing signals and sampling pulses from the VCO 28, and specifies the memory addresses 2M through 3M−1 of the frame memory area 14c.

While the image data are being stored, the image data with respect to the (N+1)th line stored in the line buffer memory unit 38 are read between a time $t_2$ and a time $t_3$, and applied through the thermal head driver 40 to the thermal head 42, by which the image data are recorded. The effective image data in the line buffer memory unit 38 are now for three lines (see FIG. 6 at (h)) at the time $t_3$. Since however the new image data have started being stored, no image data can be read from the frame memory 14 and stored in the line buffer memory unit 38. In this embodiment, the period of time required for recording one horizontal line L is 15.5 ms.

Then, the image data with respect to the (N+2)th line stored in the line buffer memory unit 38 between a time $t_4$ and a time $t_5$ are read and printed by the recording assembly 18. In this manner, the image data up to the (N+4)th line are thermally recorded between times $t_6$, $t_7$ and between times $t_8$, $t_9$.

At the time $t_9$, the effective image data in the line buffer memory unit 38 are for 0 lines. Thus far, the storage of the image data has been completed. Accordingly, the image data with respect to the (N+5)th line are read from the frame memory areas 14a, 14b and stored in the line buffer memory unit 38 between the time $t_9$ and a time $t_{10}$, and recorded after a time $t_{11}$.

Figure 7A:
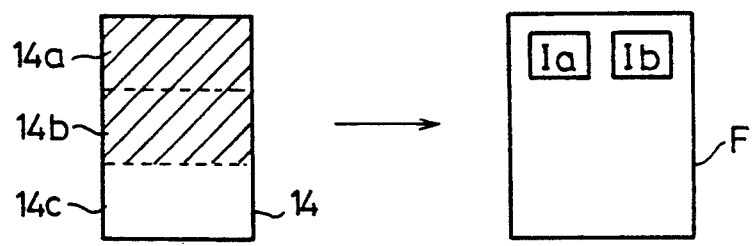
FIGS. 7A, 7B, and 7C are diagrams showing the manner in which six frames are successively recorded on a single heat-sensitive medium.
Figure 7B:
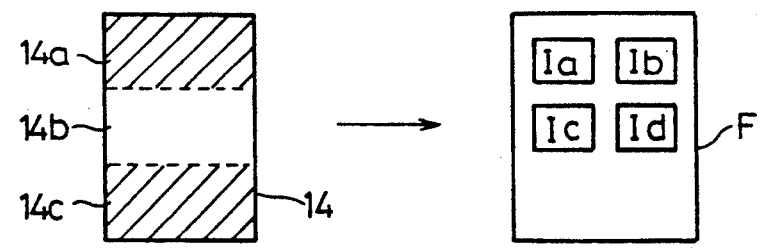
Figure 7C:
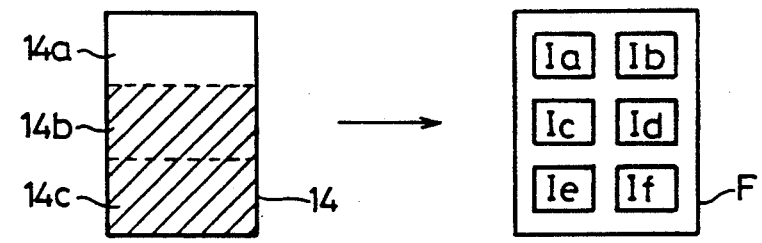

In this manner, the recording of the images in the frames Ia, Ib is finished (see FIG. 7A) Likewise, when image data are stored in the frame memory areas 14c, 14a of the frame memory 14, the recording of the images in the frames Ic, Id is finished (see FIG. 7B). When image data are stored in the frame memory areas 14b, 14c, the recording of the images in the frames Ie, If is finished (see FIG. 7C). The recording of the images in the respective six frames Ia through If on the heat-sensitive medium F is now completed.

According to the present embodiment, in order to record a maximum of six frames of image on a single recording medium, there are employed three frame memory areas, the number of which is one greater than the number of frames arranged in the main scanning direction on the recording medium. Therefore, the frame memory capacity required for achieving the same resolution is ½ of the frame memory capacity of a frame memory which has six divided frame memory areas.

In the above description, the image data are supplied to record six frames per sheet. However, when image data are supplied to record one frame per sheet and two frames per sheet, the number of pixels is increased by 2 times and 1.5 times, respectively, by the data enlarger 34. When four frames per sheet are to be recorded, the image data are transmitted as they are through the data enlarger 34. When one frame per sheet and four frames per sheet are to be recorded, since the main scanning direction A on the heat-sensitive medium F is different from the scanning direction on the image, the image data are transferred from the frame memory 14 to the line buffer memory unit 38 one vertical line at a time, rather than one scanning line at a time.

In the illustrated embodiment, the frame memory 14 is divided into a plurality of frame memory areas. However, if the number of frames arranged along the main scanning line A on the recording medium is 2, then the data storage assembly may include three frame memories for storing three frames, respectively, and three address counters connected respectively to the frame memories.

The image recording device according to the present invention should not be limited to a thermal printer, but may be employed in various printers such as a laser printer in which the recording assembly 18 and the heat-sensitive medium F are replaced with a laser scanner and a photosensitive medium, respectively.

With the present invention, as described above, in order to record one or more images on a single recording medium, there are employed a plurality of frame memory areas the number of which is at least one greater than the number of images arranged along a main scanning direction on the recording medium.

When the storage of image data in the same number of frame memory areas as the number of images arranged along the main scanning direction is completed, the stored image data are recorded, and image data are stored in the remaining frame memory areas. Consequently, the recorded images are of high resolution, and the number of required frame memory areas or the required memory capacity is reduced. Since image data relative to a new frame can be stored while the stored image data are being recorded, the time required to record desired images is shortened.

Although a certain preferred embodiment has been shown and described, it should be understood that many changes and modifications may be made therein without departing from the scope of the appended claims.

What is claimed is:

1. An image recording device for recording one or more images arranged along a main scanning direction on a single recording medium, comprising:
   recording means for recording the images on the recording medium;
   a frame memory, operatively connected to said recording means, including a number of frame memory areas, the number of said frame memory areas is at least one greater than a number of the images arranged along the main scanning direction on the recording medium; and
   determining means for determining completion of storage of image data in the number of said frame memory areas equal to the number of the images arranged along the main scanning direction, and for producing a completion signal when said completion of storage is determined.

2. An image recording device according to claim 1, wherein said device further comprises processing means for energizing said recording means to automatically record the images on the recording medium in response to said completion signal, and for storing new image data in another frame memory area.

3. An image recording device according to claim 2, wherein said processing means comprises a buffer memory for temporarily storing the image data before the image data are transferred to said recording means.

4. An image recording device according to claim 1, wherein said determining means comprises:
   storage completion signal producing means for producing a storage completion signal in response to detection of storage of image data relative to an image in each of said frame memory areas, and
   completion signal producing means for counting said storage completion signals and producing said completion signal when the count of said storage completion signals reaches a preset value.

5. An image recording device according to claim 4, wherein said storage completion signal producing means comprises an address counter for addressing said frame memory areas which store the image data.

6. An image recording device according to claim 4, wherein said completion signal producing means comprises a counter for counting down the preset value in response to said storage completion signal and producing said completion signal when the preset value reaches zero.

7. An image recording apparatus for recording a predetermined number of images on a single recording medium, said apparatus comprising:
   recording means for recording images on the recording medium, said recording means having a main scanning direction;
   frame memory means, having a first number of frame memory areas, for storing image data, each of the frame memory areas stores a frame of the image data; and
   control means for determining a preset number of images to be recorded along the main scanning direction, the preset number being less than the first number for controlling the storing of the image data to a second number of the frame memory areas said second number is equal to the preset number of images, for controlling said recording means to record the images on the recording medium when the second number of the frame memory areas contain the image data, and for storing the image data to one of the frame memory areas concurrently with the recording.

8. An apparatus according to claim 7, wherein the preset number is one less than the first number.

9. An apparatus according to claim 7, wherein the predetermined number ranges from 1 to 6, the first number is 3, and the preset number ranges from 1 to 2.

10. An apparatus according to claim 7, wherein said apparatus further comprises data enlarger means for enlarging the image data in accordance with the predetermined number.

11. An apparatus according to claim 7, wherein said apparatus further comprises line buffer means for temporarily storing the image data from the second number of the frame memory areas before the image data is transferred to said recording means.

12. An apparatus according to claim 11, wherein said control means comprises:
   a single address counter for addressing said frame memory means and for producing a storage completion signal; and
   a counter for counting down from said preset number in response to the storage completion signal to produce a measured value, and
   wherein the controlling of said recording means to record the images on the recording medium when the second number of the frame memory areas contain the image data is determined by said control means when the measured value in said counter reaches zero.

13. A method for recording a predetermined number of images on a single recording medium using a frame memory having a first number of frame memory areas, each of the frame memory areas stores a frame of image data, said method comprising:
   (a) determining a preset number of image to be recorded along a main scanning direction, the preset number is less than the first number;
   (b) storing the image data to a second number of the frame memory areas said second number is equal to the preset number of images;
   (c) recording images on the recording medium when the second number of the frame memory areas contain the image data stored thereto in step (b); and
   (d) storing, concurrently with said recording in step (c), the image data to one of the frame memory areas other than the frame memory areas containing the image data being recorded in step (c).

* * * * *

UNITED STATES PATENT AND TRADEMARK OFFICE
CERTIFICATE OF CORRECTION

PATENT NO.   : 5,189,439
DATED        : Feb. 23, 1993
INVENTOR(S)  : Yumoto et al.

It is certified that error(s) appears in the above-identified patent and that said Letters Patent is hereby corrected as shown below:

On the face of the patent, line [73], please add the following Assignee

--Nagano Nihon Musen Kabushiki Kaisha, Nagano, Japan--.

Signed and Sealed this

Fifth Day of August, 1997

Attest:

BRUCE LEHMAN

Attesting Officer

Commissioner of Patents and Trademarks